United States Patent
Tanaka et al.

(10) Patent No.: US 12,003,189 B2
(45) Date of Patent: Jun. 4, 2024

(54) CONTROL POWER SOURCE APPARATUS

(71) Applicant: DAIKIN INDUSTRIES, LTD., Osaka (JP)

(72) Inventors: Toshiyuki Tanaka, Osaka (JP); Minoru Chihara, Osaka (JP); Shinji Kouno, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 148 days.

(21) Appl. No.: 17/679,396

(22) Filed: Feb. 24, 2022

(65) Prior Publication Data

US 2022/0181988 A1    Jun. 9, 2022

Related U.S. Application Data

(63) Continuation of application No. PCT/JP2020/034259, filed on Sep. 10, 2020.

(30) Foreign Application Priority Data

Oct. 29, 2019    (JP) ................................. 2019-196275

(51) Int. Cl.
*H02M 7/04* (2006.01)
*F24F 11/88* (2018.01)
*H02M 7/00* (2006.01)

(52) U.S. Cl.
CPC ............... *H02M 7/04* (2013.01); *F24F 11/88* (2018.01); *H02M 7/003* (2013.01)

(58) Field of Classification Search
CPC ........ F24F 11/88; H02K 5/225; H02M 7/003; H02M 7/04
See application file for complete search history.

(56) References Cited

U.S. PATENT DOCUMENTS 10,270,357 B2 *    4/2019   Aoshima ............... H02M 7/003
2014/0232181 A1 *  8/2014   Tsuji ....................... H02M 7/42
                                                            307/10.1

(Continued)

FOREIGN PATENT DOCUMENTS

CN          203588429 U      5/2014
CN          110199158 A      9/2019

(Continued)

OTHER PUBLICATIONS

International Search Report, issued in PCT/JP2020/034259, PCT/ISA/210, dated Nov. 17, 2020.

(Continued)

*Primary Examiner* — Levi Gannon
(74) *Attorney, Agent, or Firm* — Birch, Stewart, Kolasch & Birch, LLP

(57) ABSTRACT

A control power source apparatus 100 includes: a power source board 2 accommodated in an electric component box 1 made of an incombustible material; a first power source unit PS1 provided at the power source board 2 and configured to supply electric power having an upper limit of a predetermined value; a second power source unit PS2 provided at the power source board 2 and configured to supply electric power having an upper limit of a predetermined value; a first load circuit L1 provided outside the electric component box 1 and configured to be supplied with electric power from the first power source unit PS1; and a second load circuit L2 provided outside the electric component box 1 so as to be electrically independent from the first load circuit L1, and configured to be supplied with electric power from the second power source unit PS2.

6 Claims, 4 Drawing Sheets

(56) References Cited

U.S. PATENT DOCUMENTS

| | | | |
|---|---|---|---|
| 2014/0286070 A1* | 9/2014 | Shin .................. | H02M 7/003 |
| | | | 363/131 |
| 2017/0054382 A1 | 2/2017 | Suigisawa | |
| 2017/0354047 A1 | 12/2017 | Okura et al. | |

FOREIGN PATENT DOCUMENTS

| | | | | |
|---|---|---|---|---|
| EP | 3 572 737 A1 | | 11/2019 | |
| JP | 2001104549 A | * | 4/2001 | .............. A63F 7/02 |
| JP | 2007-120821 A | | 5/2007 | |
| KR | 20-0389730 Y1 | | 7/2005 | |

OTHER PUBLICATIONS

English translation of the International Preliminary Report on Patentability and Written Opinion of the International Searching Authority for International Application No. PCT/JP2020/034259, dated May 12, 2022.

Extended European Search Report for European Application No. 20881284.2, dated Mar. 17, 2023.

* cited by examiner

CONTROL POWER SOURCE APPARATUS

CROSS REFERENCE TO RELATED APPLICATIONS

This application is a Continuation of PCT International Application No. PCT/JP2020/034259 filed on Sep. 10, 2020, which claims priority under 35 U.S.C. § 119(a) to Patent Application No. 2019-196275 filed in Japan on Oct. 29, 2019, all of which are hereby expressly incorporated by reference into the present application.

TECHNICAL FIELD

The present disclosure relates to a control power source apparatus.

BACKGROUND ART

Electric equipment is equipped with a control power source apparatus. An air conditioner is equipped with a control power source apparatus including a power source board and a control board, which are accommodated in an indoor unit or the like. The control power source apparatus needs to be designed so as to be accommodated in an electric component box made of an incombustible material such as an iron plate against the event of ignition. The electric component box configured to accommodate the two boards is large in size and is also complicated in shape. In view of this, there has been proposed to design the control board to consume electric power not exceeding a predetermined value and accommodate only the power source board in the electric component box (see PATENT LITERATURE 1 or the like).

CITATION LIST

Patent Literature

PATENT LITERATURE 1: Japanese Laid-Open Patent Publication No. 2007-120821

SUMMARY (1) A control power source apparatus according to the present disclosure includes: a power source board accommodated in an electric component box made of an incombustible material; a first power source unit provided at the power source board and configured to supply electric power having an upper limit of a predetermined value; a second power source unit provided at the power source board and configured to supply electric power having an upper limit of a predetermined value; a first load circuit provided outside the electric component box and configured to be supplied with electric power from the first power source unit; and a second load circuit provided outside the electric component box so as to be electrically independent from the first load circuit, and configured to be supplied with electric power from the second power source unit.

DETAILED DESCRIPTION

First Embodiment

The first embodiment will be described hereinafter.

Figure 1:
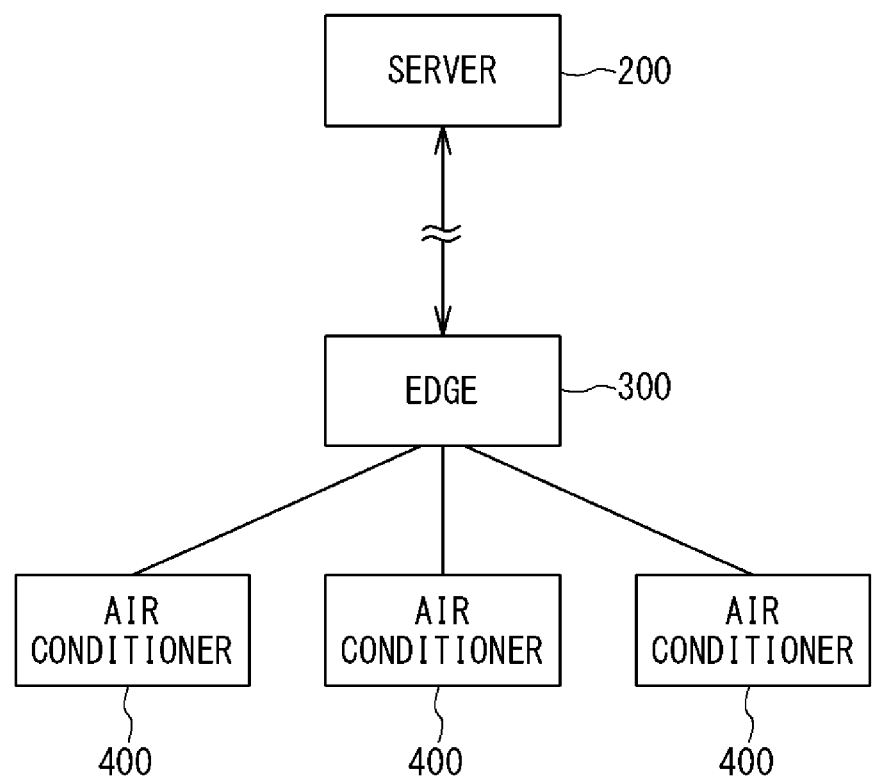
FIG. 1 is a diagram depicting an exemplary system configuration from a server to air conditioners.

FIG. 1 is a diagram depicting an exemplary system configuration from a server to air conditioners. FIG. 1 depicts a server 200 and an edge 300 network connected to each other. The edge 300 is locally network connected to a plurality of (three as exemplified herein) air conditioners 400. The edge 300 transmits to each of the air conditioners 400 being connected, an air conditioner operation command received from the server 200. The edge 300 periodically transmits, to the server 200, information on operation of the air conditioners 400.

Figure 2:
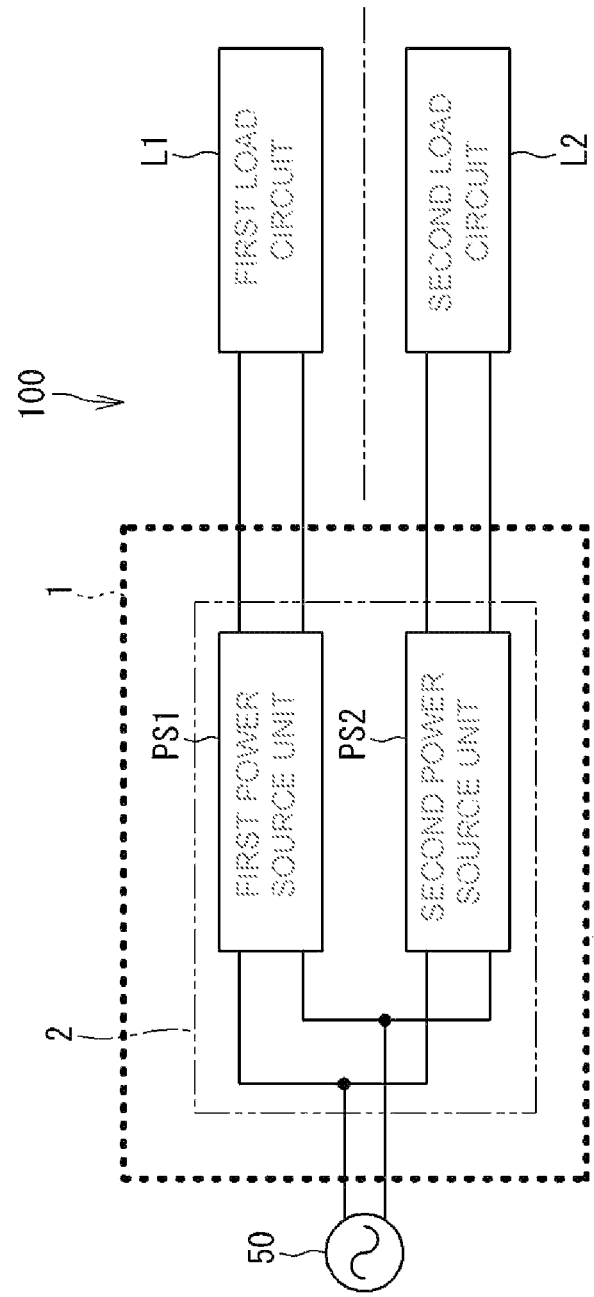
FIG. 2 is a diagram depicting a basic concept of a control power source apparatus simplified and applied to an edge.

FIG. 2 is a diagram depicting a basic concept of a control power source apparatus 100 simplified and applied to the edge 300. This figure depicts an electric component box 1 made of an incombustible material such as an iron plate having been subjected to sheet metal processing. The electric component box 1 accommodates a power source board 2. The single power source board 2 is equipped with a first power source unit PS1 and a second power source unit PS2.

The first power source unit PS1 and the second power source unit PS2 are each supplied with AC voltage from an AC power source 50 provided outside the electric component box 1. A first load circuit L1 is connected to the first power source unit PS1 and is supplied with electric power. A second load circuit L2 is connected to the second power source unit PS2 and is supplied with electric power. The first load circuit L1 and the second load circuit L2 are electrically independent from each other. The expression "electrically independent from each other" indicates that there is no electric current path between these loads.

The following description merely exemplifies numerical values of electric power and voltage, and the present disclosure should not be limited by the numerical values.

Each of the first power source unit PS1 and the second power source unit PS2 includes a current limiting circuit to be described later to have output limited to a predetermined value (15 W) or less. Accordingly, the first load circuit L1 and the second load circuit L2 both have load power of the predetermined value or less. However, the first load circuit L1 and the second load circuit L2 have total load power that can exceed the predetermined value. Each of the first load circuit L1 and the second load circuit L2 does not independently exceed the predetermined value in this case, and thus does not need to be accommodated in a box made of an incombustible material. The control power source apparatus 100 thus allows increase in load power at low cost with no need for increase in size of the electric component box 1 or provision of any additional electric component box.

Figure 3:
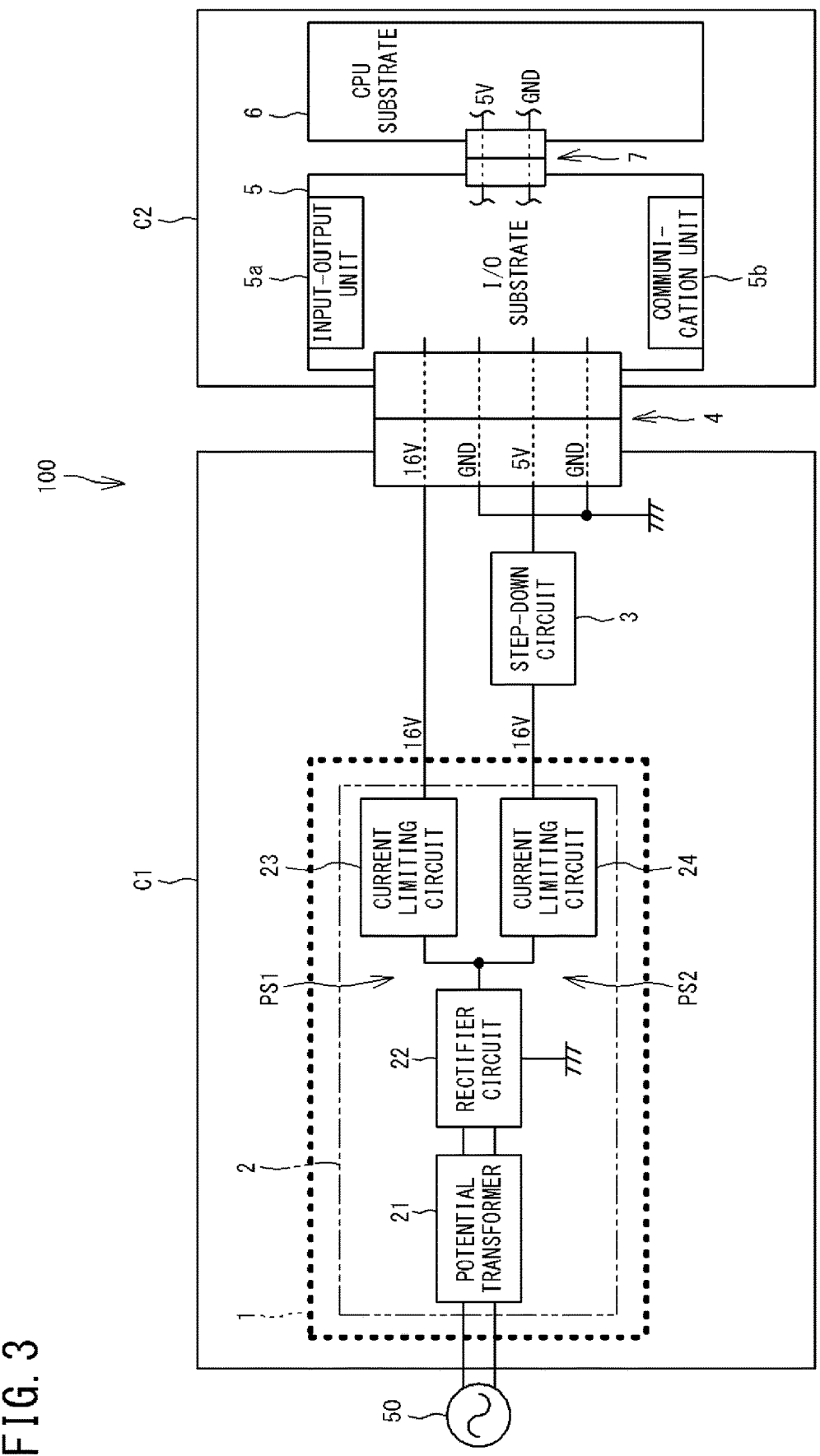
FIG. 3 is a specific circuit configuration diagram of the control power source apparatus depicted in FIG. 2.

FIG. 3 is a specific circuit configuration diagram of the control power source apparatus 100 depicted in FIG. 2. The power source board 2 depicted in FIG. 3 is provided with a potential transformer 21 configured to transform (step down) voltage of the AC power source 50, a rectifier circuit 22 configured to rectify secondary voltage of the potential transformer 21, and a pair of current limiting circuits 23 and 24 connected to the rectifier circuit 22. The rectifier circuit 22 has output having positive output supplied to the current limiting circuits 23 and 24, and negative output connected to a ground (GND).

The potential transformer 21, the rectifier circuit 22, and the current limiting circuit 23 correspond to the first power source unit PS1 depicted in FIG. 2. The potential transformer 21, the rectifier circuit 22, and the current limiting circuit 24 correspond to the second power source unit PS2 depicted in FIG. 2.

The current limiting circuits 23 and 24 each output DC voltage of 16 V. Each of the current limiting circuits 23 and 24 internally detects output current and limit the current, to have an upper limit of output power set to the predetermined value (15 W). The electric component box 1 is provided thereout with a step-down circuit 3 including a regulator or the like. The step-down circuit 3 steps down DC 16 V transmitted from the current limiting circuit 24 to DC 5 V and outputs the stepped down voltage. The current limiting circuit 23 has output (DC 16 V) to be outputted without being stepped down.

The electric component box 1 and the step-down circuit 3 are accommodated in a first case C1. The first case C1 and a second case C2 are electrically connected to each other via a connector 4 or the like. The connector 4 exemplarily has four terminals including a 16V terminal, a GND terminal, a 5V terminal, and a GND terminal aligned in the mentioned order. The two GND terminals are connected to the ground (GND) at a position adjacent to the first case C1. The GND terminal is interposed between the terminals having different voltage values of 16 V and 5 V, for reduced possibility of accidental damage by fault contact between the terminals having the different voltage values.

The second case C2 accommodates an I/O substrate 5 and a CPU substrate 6. The connector 4 is attached to the I/O substrate 5. The I/O substrate 5 and the CPU substrate 6 are electrically connected to each other via a connector 7. The I/O substrate 5 is exemplarily equipped with an input-output unit 5a for digital signals, and a communication unit 5b configured to communicate with control target equipment (e.g., an indoor unit). The CPU substrate 6 is equipped with a CPU.

The I/O substrate 5 adopts 16 V. The CPU substrate adopts 5 V. Wiring for 5 V received via the connector 4 passes the I/O substrate 5 and is connected to the CPU substrate 6. The CPU substrate 6 is thus disposed downstream of the I/O substrate 5 in terms of a power source supply flow. In comparison to another case where the CPU substrate 6 is disposed upstream of the I/O substrate 5, wiring for 16 V does not need to pass the CPU substrate 6 lower in voltage in this configuration, which can inhibit a drop in voltage of 16 V supplied to the I/O substrate 5. Furthermore, the CPU mounted on the CPU substrate 6 is less likely to have influence (e.g., noise) of electric current supplied to the I/O substrate 5. There is no need to accommodate in a box made of an incombustible material even when totally 15 W or more is used in the second case C2. This is because none of the circuit for 16 V and the circuit for 5 V independently exceeds 15 W.

Second Embodiment

The second embodiment will be described next.

Figure 4:
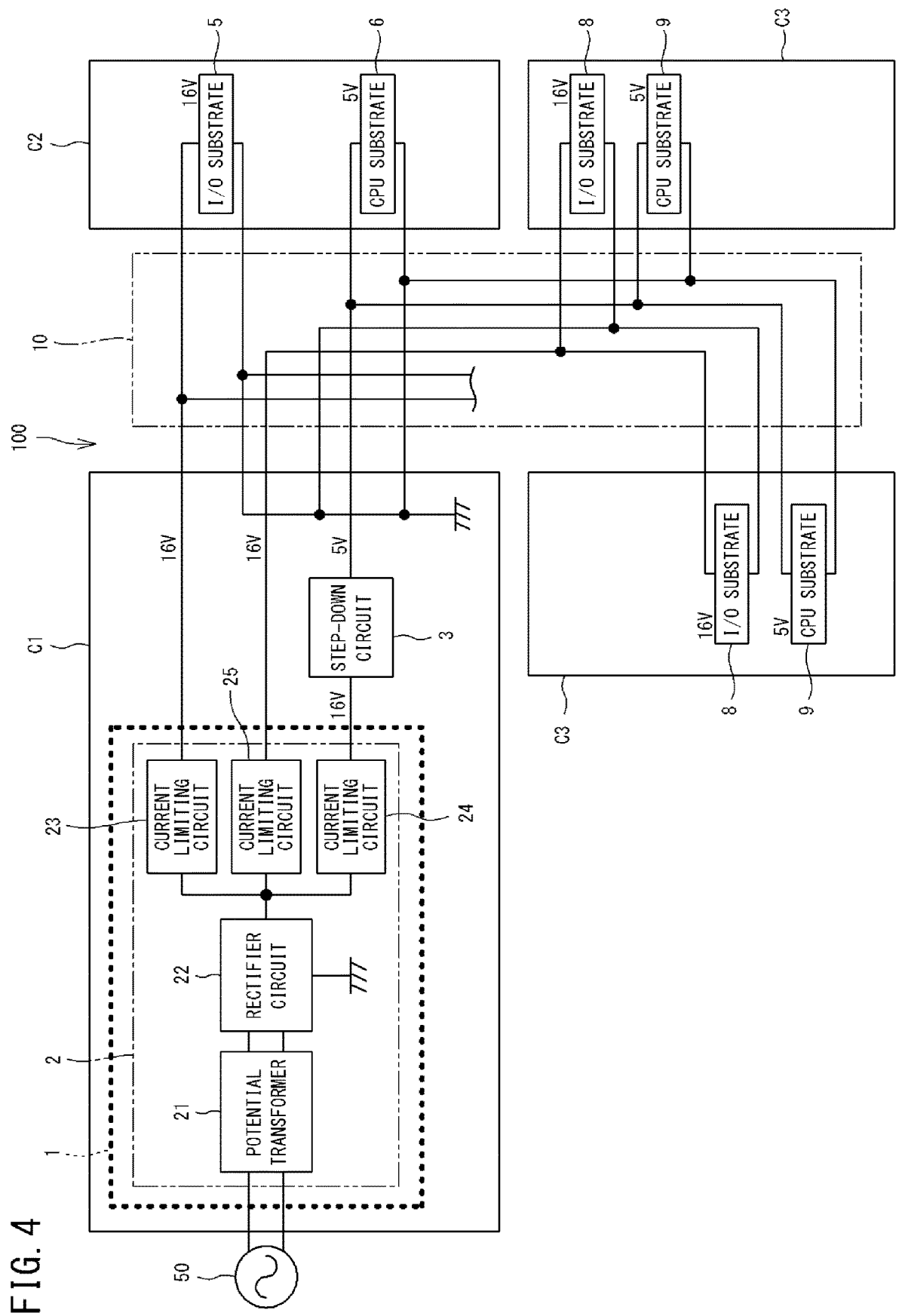
FIG. 4 is a circuit configuration diagram of a control power source apparatus according to a second embodiment.

FIG. 4 is a circuit configuration diagram of a control power source apparatus 100 according to the second embodiment. FIG. 4 depicts a power source board 2 provided with a potential transformer 21 configured to transform (step down) voltage of an AC power source 50, a rectifier circuit 22 configured to rectify secondary voltage of the potential transformer 21, and three current limiting circuits 23, 24, and 25 connected to the rectifier circuit 22. The rectifier circuit 22 has output having positive output supplied to the current limiting circuits 23 to 25, and negative output connected to a ground (GND).

The potential transformer 21, the rectifier circuit 22, and one of the current limiting circuits 23 to 25 correspond to the first power source unit PS1 depicted in FIG. 2. The potential transformer 21, the rectifier circuit 22, and a different one of the current limiting circuits 23 to 25 correspond to the second power source unit PS2 depicted in FIG. 2.

The current limiting circuits 23 to 25 each output DC voltage of 16 V. Each of the current limiting circuits 23 to 25 internally detects output current and limits the current, to have an upper limit of output power set to a predetermined value (15 W). An electric component box 1 is provided thereout with a step-down circuit 3 including a regulator or the like. The step-down circuit 3 steps down DC 16 V transmitted from the current limiting circuit 24 to DC 5 V and outputs the stepped down voltage. The current limiting circuits 23 and 24 each have output (DC 16 V) to be outputted without being stepped down.

The electric component box 1 and the step-down circuit 3 are accommodated in a first case C1. A second case C2 is similar to that depicted in FIG. 3 or the like, and includes an I/O substrate 5 and a CPU substrate 6. There are exemplarily provided two third cases C3, each of which includes an I/O substrate 8 and a CPU substrate 9 at least similar to those of the second case. Each of the third cases C3 may alternatively be equipped with a circuit other than the I/O substrate 8 and the CPU substrate 9, differently from the second case C2. The first case C1, the second case C2, and the two third cases C3 are each attached to a slot 10 so as to be electrically connected as depicted. The slot 10 can be physically (mechanically) provided thereon with the first case C1, the second case C2, and the third cases C3 being aligned. The present embodiment enables connection and use of at most seven cases. An eighth case and any more cases are physically attachable, but the present configuration does not have supply of electric power to these additional cases.

In view of the three current limiting circuits 23 to 25, there are provided loads including three system loads independent from one another (a 16V load, another 16V load, and a 5V load). Each of the systems does not independently exceed the predetermined value (15 W) for electric power. However, the systems can totally exceed the predetermined value. The systems each utilizing maximum electric power leads to 45 W in total. However, there is no need to accommodate, in a box made of an incombustible material, the I/O substrates 5 and 8 and the CPU substrates 6 and 9 of the second and third cases C2 and C3. This is because each of the systems does not independently exceed 15 W.

DISCLOSURE SUMMARY

The above disclosure can be expressed generally as follows.

A control power source apparatus 100 according to the present disclosure includes: a power source board 2 accommodated in an electric component box 1 made of an incombustible material; a first power source unit PS1 provided at the power source board 2 and configured to supply electric power having an upper limit of a predetermined value; a second power source unit PS2 provided at the power source board 2 and configured to supply electric power having an upper limit of a predetermined value; a first load circuit L1 provided outside the electric component box 1 and configured to be supplied with electric power from the first power source unit PS1; and a second load circuit L2 provided outside the electric component box 1 so as to be electrically independent from the first load circuit L1, and configured to be supplied with electric power from the second power source unit PS2. The predetermined value (first predetermined value) for limitation of the first power source unit and the predetermined value (second predetermined value) for limitation of the second power source unit PS2 are not necessarily equal to each other. For example, the second predetermined value may be less than the first predetermined value.

In the control power source apparatus 100 thus configured, the first power source unit PS1 and the second power source unit PS2 are accommodated in the electric component box 1 having secured incombustibility. The first power source unit PS1 and the second power source unit PS2 supply electric power to the first load circuit L1 and the second load circuit L2 electrically independent from each other. This accordingly achieves the upper limits not exceeding the predetermined values for electric power of the power source units (PS1 and PS2), and provision of electric power exceeding the predetermined value in terms of the total loads. Neither the first load circuit L1 nor the second load circuit L2 has load power independently exceeding the predetermined value. Accordingly, the first load circuit and the second load circuit do not need to be covered with any incombustible material, which enables manufacture at lower cost.

The control power source apparatus 100 includes: a first case C1 accommodating the electric component box 1; a second case C2 accommodating the first load circuit L1 and the second load circuit L2; and a connector 4 electrically connecting the first case C1 and the second case C2.

In this case, the connector 4 facilitates connection between the cases.

There is provided a step-down circuit 3 accommodated in the first case C1, disposed outside the electric component box 1, and configured to step down voltage outputted from the electric component box 1 or the like.

In this case, the step-down circuit 3 is disposed outside the electric component box 1 that can be further reduced in size.

The connector 4 preferably has wiring alignment such that wiring for a GND is provided between a voltage output line (e.g., 16 V) of the first power source unit PS1 and a voltage output line (e.g., 5 V) of the second power source unit PS2.

This configuration can inhibit accidental damage by fault contact between voltage lines. This configuration can eventually inhibit load power from exceeding the predetermined value due to damage by fault contact.

The second case C2 accommodates an input-output substrate 5 (I/O substrate 5) connected to the connector 4 and configured to receive output of the first power source unit PS1 and output of the second power source unit PS2, and a CPU substrate 6 equipped with a CPU and configured to receive output of the second power source unit PS2 via the input-output substrate 5.

In this case, the CPU substrate 6 configured to utilize only output voltage from the second power source unit PS2 can be disposed downstream of the input-output substrate 5. The first power source unit PS1 thus has output wiring that does not need to pass the CPU substrate 6. In comparison to another case where the CPU substrate 6 is disposed upstream of the input-output substrate 5, output wiring for the first power source unit PS1 does not need to pass the CPU substrate 6 in this configuration, which can inhibit a drop in voltage supplied to the input-output substrate 5. Furthermore, the CPU mounted on the CPU substrate 6 is less likely to have influence (e.g., noise) of electric current supplied to the input-output substrate 5.

There may be provided one or a plurality of third cases C3 including load circuits similar to those of the second case C2, in which the connector may constitute a slot 10 provided with the second case C2 and the third case C3 and configured to electrically connect the second case and the third case to each other.

Such a configuration facilitates additional provision of the third case C3. Total load power of all the cases is assumed to be within the predetermined value for each of the first and second power source units PS1 and PS2.

At least part of the embodiments described above may be appropriately combined with each other.

The second and third cases C2 and C3 are merely exemplified in terms of their numbers. A plurality of cases can be connected as long as a single system connected to a single current limiting circuit has load power not exceeding the predetermined value (15 W).

The embodiments have been described above. Various modifications to modes and details should be available without departing from the object and the scope of the claims.

REFERENCE SIGNS LIST 1 electric component box
2 power source board
3 step-down circuit
4 connector
I/O substrate (input-output substrate)
5a input-output unit
5b communication unit
CPU substrate
connector
I/O substrate (input-output substrate)
CPU substrate
10 slot
potential transformer
22 rectifier circuit
23, 24, 25 current limiting circuit
50 AC power source
100 control power source apparatus
200 server
300 edge
400 air conditioner
C1 first case
C2 second case
C3 third case
L1 first load circuit
L2 second load circuit
PS1 first power source unit
PS2 second power source unit

The invention claimed is:

1. A control power source apparatus comprising:
a power source board (2) accommodated in an electric component box (1) made of an incombustible material;
a first power source unit (PS1) provided at the power source board (2) and comprising a first current limiting circuit configured to enable the first power source unit (PS1) to supply electric power that is limited by an upper limit of a predetermined value;
a second power source unit (PS2) provided at the power source board (2) and comprising a second current limiting circuit configured to enable the second power source unit (PS2) to supply electric power that is limited by an upper limit of a predetermined value;

a step-down circuit (3) disposed outside the electric component box (1) and connected to the first current limiting circuit or the second current limiting circuit, the step-down circuit being configured to step down voltage outputted from the electric component box (1);

a first load circuit (L1) provided outside the electric component box (1) and configured to be supplied with electric power from the first power source unit (PS1); and a second load circuit (L2) provided outside the electric component box (1) so as to be electrically independent from the first load circuit (L1), and configured to be supplied with electric power from the second power source unit (PS2).

2. The control power source apparatus according to claim 1, the apparatus comprising:

a first case (C1) accommodating the electric component box (1);

a second case (C2) accommodating the first load circuit (L1) and the second load circuit (L2); and a connector (4) electrically connecting the first case (C1) and the second case (C2).

3. The control power source apparatus according to claim 2, wherein the step-down circuit (3) is accommodated in the first case (C1).

4. The control power source apparatus according to claim 2, wherein, the connector (4) has wiring alignment such that wiring for a GND is provided between a voltage output line of the first power source unit (PS1) and a voltage output line of the second power source unit (PS2).

5. The control power source apparatus according to claim 2, wherein the second case (C2) accommodates
an input-output substrate (5) connected to the connector (4) and configured to receive output of the first power source unit (PS1) and output of the second power source unit (PS2), and
a CPU substrate (6) equipped with a CPU and configured to receive output of the second power source unit (PS2) via the input-output substrate (5).

6. The control power source apparatus according to claim 2, the apparatus comprising one or a plurality of third cases (C3) including load circuits similar to those of the second case (C2), wherein the connector constitutes a slot (10) provided with the second case (C2) and the third case (C3) and configured to electrically connect the second case (C2) and the third case (C3) to each other.

* * * * *